(12) United States Patent
Eames et al.

(10) Patent No.: US 6,493,875 B1
(45) Date of Patent: *Dec. 10, 2002

(54) IN-HOME WIRELESS

(75) Inventors: Thomas R. Eames, Santa Rosa, CA (US); Tevfik M. Uraz, Santa Rosa, CA (US); Grant E. Moulton, Santa Rosa, CA (US)

(73) Assignee: Next Level Communications, Inc., Rohnert Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/026,038

(22) Filed: Feb. 19, 1998

Related U.S. Application Data (60) Provisional application No. 60/038,426, filed on Feb. 19, 1997.

(51) Int. Cl.⁷ .......................... H04N 7/18; H04N 7/173; G06F 15/16
(52) U.S. Cl. .......................... 725/81; 725/74; 725/118; 725/105; 725/106; 725/119; 709/217
(58) Field of Search .............................. 348/6, 7, 8, 21; 455/3.1, 3.3, 4.2, 557, 6.3; 370/537, 487, 390; 725/120–125, 78–81, 74, 118–119, 105–106; 375/222; 709/217–219

(56) References Cited

U.S. PATENT DOCUMENTS

| | | | | |
|---|---|---|---|---|
| 5,521,631 A | * | 5/1996 | Budow et al. .................. 348/7 |
| 5,574,964 A | | 11/1996 | Hamlin ....................... 455/3.1 |
| 5,610,916 A | * | 3/1997 | Kostreski et al. ........... 370/487 |
| 5,613,191 A | * | 3/1997 | Hylton et al. ................ 455/3.1 |
| 5,628,055 A | * | 5/1997 | Stein ........................... 455/557 |
| 5,630,204 A | * | 5/1997 | Hylton et al. ................ 455/3.3 |
| 5,651,010 A | * | 7/1997 | Kostreski et al. ........... 370/537 |
| 5,659,353 A | * | 8/1997 | Kostreski et al. ............. 348/21 |
| 5,699,105 A | * | 12/1997 | Chen et al. .................. 725/120 |
| 5,708,961 A | * | 1/1998 | Hylton et al. ................ 455/4.2 |
| 5,715,020 A | | 2/1998 | Kuroiwa et al. ............ 348/734 |
| 5,729,279 A | * | 3/1998 | Fuller ............................. 348/8 |
| 5,770,971 A | * | 6/1998 | McNicol ....................... 330/52 |
| 5,828,403 A | * | 10/1998 | DeRodeff et al. ............... 348/7 |
| 5,842,111 A | * | 11/1998 | Byers ......................... 455/6.3 |
| 5,850,340 A | * | 12/1998 | York .......................... 364/188 |
| 5,905,726 A | * | 5/1999 | Gupta ........................ 370/390 |
| 5,933,192 A | | 8/1999 | Crosby et al. ................ 348/10 |
| 5,936,660 A | * | 8/1999 | Gurantz ....................... 348/10 |
| 5,963,872 A | * | 10/1999 | Stein .......................... 455/557 |
| 5,987,061 A | * | 11/1999 | Chen .......................... 375/222 |
| 6,047,175 A | * | 4/2000 | Trompower ................. 455/422 |
| 6,317,884 B1 | * | 11/2001 | Eames et al. .................. 725/78 |

OTHER PUBLICATIONS

Co–Pending Related U.S. patent application No. 09/026,036, Title: Video, Data and Telephony Gateway, filed Feb. 19, 1998.

Co–Pending Related U.S. patent application No. 09/488,275, Title: Video, Data and Telephony Gateway, filed Jan. 20, 2000.

(List continued on next page.)

Primary Examiner—Andrew Faile
Assistant Examiner—Hai V. Tran
(74) Attorney, Agent, or Firm—Covington & Burling (57) ABSTRACT

In a residential environment with more than one analog television set a residential gateway has a network interface module which receives signals from a telecommunications network. The signals contain compressed digital video information which is routed within the gateway to a video module for the generation of an analog video signal for a television set located near the residential gateway, and to a wireless module for transmission to a remote receiver using spread spectrum communications.

20 Claims, 5 Drawing Sheets

OTHER PUBLICATIONS

Co–Pending Related U.S. patent application No. 09/612,562, Title: Wireless and xDSL Residential Gateway and System, filed Jul. 7, 2000.

Co–Pending Related U.S. patent application No. 09/526,100, Title: Optical Conversion Device, filed Mar. 15, 2000.

Co–Pending Related U.S. patent application No. 09/525,412, Title: Media Interface Device, filed Mar. 15, 2000.

Co–Pending Related U.S. patent application No. 09/525,488, Title: Method and Apparatus for Transmitting Wireless Signals Over Media, filed Mar. 15, 2000.

Residential Gateway Group publication, "The residential gateway", Oct., 1995, 8 pp.

Generic Requirement, Bellcore, "Active Network Interface Device (Residential Gateway)," GR–2890–CORE, issue 2, Nov. 1996, 19 pp.

Specifications, GTE, "The residential gateway functional specifications," printed from the World Wide Web site http://info.gte.com/gtel/sponsored/rg/webspec.htm on Jul. 24, 1996, 6 pp.

* cited by examiner

IN-HOME WIRELESS

CROSS-REFERENCE TO PRIOR APPLICATIONS

This application claims the benefit of U.S. Provisional Application No. 60/038,426 filed Feb. 19, 1997.

FIELD OF THE INVENTION

The present invention relates to an apparatus for the distribution of video, data and telephony and other telecommunications services within a residence.

BACKGROUND OF THE INVENTION

Advances in the field of telecommunications allow large amounts of digital information to be delivered to residences. Inside the residence, devices can be connected to the network by twisted wire pairs which provide telephone services today, or by coaxial cable similar to that used by cable operators to provide cable TV services.

However, it may not be possible to transmit high-speed digital data over the twisted wire pairs in the home, and coaxial cable wiring is not present in all homes. Furthermore, there may be neighborhoods in which some homes have coaxial cable wiring which will support devices for the reception and transmission of high-speed digital data, while some of the homes do not. Since devices for communication over the coaxial wiring will be made available to the residents by a telecommunications service provider, it would be advantageous to have a means for distributing high-speed digital data in those homes which do not have coaxial cable wiring which is compatible with the devices used in the homes with coaxial cable wiring.

For the foregoing reasons, there is a need for a means of distributing high-speed data signals within a residence which is connected to a broadband access system.

SUMMARY OF THE INVENTION

A wireless gateway located in a residence is connected to a broadband access system and transmits data received from the network to the devices in the residence using wireless transmission techniques, and receives data from the devices using wireless transmission techniques, and transmits that data onto the broadband access network.

In a preferred embodiment a downstream Time Division Multiplexed Quadrature Amplitude Modulated signal which is spectrally spread using a direct sequence signal in one or more 22 MHz wide channels in the 2.4 GHz range is transmitted from the wireless gateway to the devices in the residence at a data rate in the range of 10–30 Mb/s. An upstream signal which is Quadrature Amplitude Modulated and spectrally spread is transmitted from each device to the wireless gateway in one of eleven 22 MHz wide channels in the 2.4 GHz frequency range. In the upstream direction Time Division Multiple Access is used to permit each of the devices to access the upstream channel. Spreading of the spectrum is used in both the downstream and upstream directions to reduce interference between different residences which have wireless gateways. The 22 MHz channels available to the gateway are overlapping but centered at different frequencies. Different residences can use the same spectrum, but the different centering of the channels and spreading of the spectrum prevent interference between signals from the devices in one home and wireless gateway in an adjacent home and visa-versa.

In an alternate embodiment one 60.5 MHz wide channel is used for downstream communications from the wireless gateway to the devices at a data rate in the range of 10–30 Mb/s. The downstream signal is a Time Division Multiplexed signal which is Quadrature Amplitude Modulated onto a carrier centered at 2.430 GHz. The signal is spectrally spread using a code. In the upstream direction a 20.875 MHz channel centered at 2.473 GHz is used to transmit data a rate in the range of 2–6 Mb/s, using Quadrature Amplitude Modulation with spectral spreading. In the upstream direction Time Division Multiple Access is used to permit each of the devices to access the upstream channel. As in the downstream direction, codes are used to spread the spectrum.

In the alternate embodiment codes are used to reduce interference between homes. This is possible because the codes used by different homes are orthogonal or quasi-orthogonal, and gateways and devices in one home which receive signals from gateways or devices in another home are able to distinguish desirable from undesirable signals because the codes used in each home are different.

In the event that the codes used by adjacent homes are identical, the first gateway to determine that there is interference from another gateway will alter its code to one which is not subject to interference.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 5 in particular, the apparatus of the present invention is disclosed.

Figure 1:
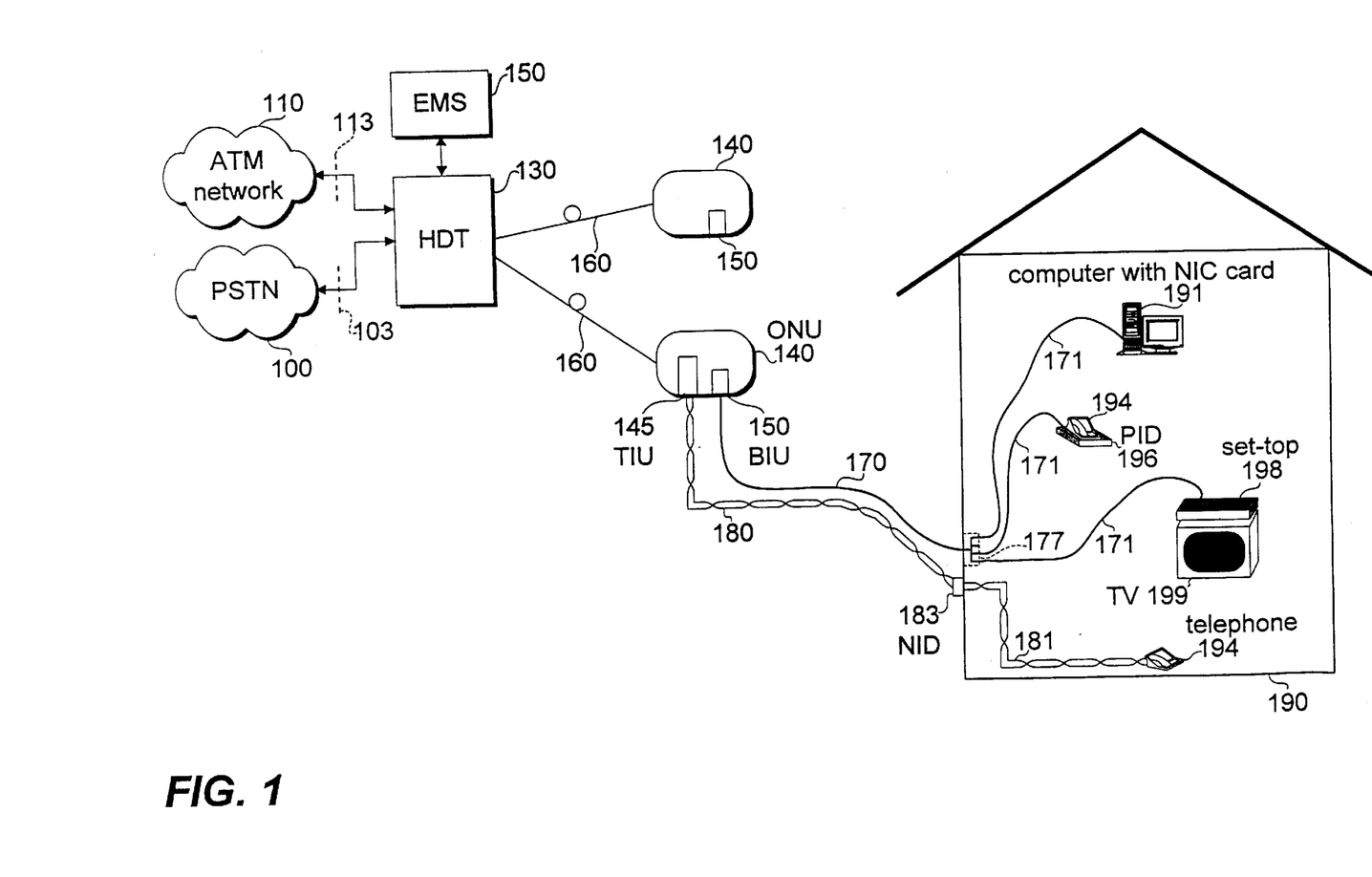
FIG. 1 illustrates a fiber-to-the-curb-access system with coaxial drop cables.

FIG. 1 illustrates a Fiber-to-the-Curb (FTTC) network in which various devices in the residence 190 are connected to the Public Switched Telecommunications Network (PSTN) 100 or Asynchronous Transfer Mode (ATM) network 110. The devices in the residence 190 can include telephone 194, television (TV) 199 with a television set-top 198, computer with Network Interface Card (NIC) 191, and Premises Interface Device (PID)196 connected to a telephone 194.

The FTTC network illustrated in FIG. 1 works by connecting a Host Digital Terminal 130 to the PSTN 100 and ATM network 110. The PSTN-HDT interface 103 is specified by standards bodies, and in the US are specified by Bellcore specification TR-TSY-000008, TR-NWT-000057 or TR-NWT-000303. The HDT 130 can also receive special services signals from private or non-switched public networks. The physical interface to the PSTN is twisted wire pairs carrying DS-1 signals, or optical fibers carrying OC-3 optical signals.

The interface to the ATM network-HDT interface 113 can be realized using an OC-3 or OC-12c optical interfaces carrying ATM cells. In a preferred embodiment, HDT 100 has two OC-12c broadcast ports, which can only receive signals carrying ATM cells, and one OC-12c interactive port which can receive and transmit signals.

An element management system (EMS) 150 is connected to HDT 130 and is used to provision services and equipment on the FTTC network, in the central office where the HDT 130 is located, in the field, or in the residences. The EMS 150 is software based and can be run on a personal computer in which case it will support one HDT 130 and the associated access network equipment connected to it, or can be run on a workstation in which case multiple HDTs and access networks are supported.

Optical Network Units (ONUs) 140 are located in the serving area and are connected to HDT 130 via optical fiber 160. Digital signals in a Synchronous Digital Hierarchy (SDH)-like format at a rate of 155 Mb/s are transmitted to and from each ONU 140 over optical fiber 160. In a preferred embodiment optical fiber 160 is a single-mode fiber and a dual wavelength transmission scheme is used to communicate between ONU 140 and HDT 130.

A Telephony Interface Unit (TIU) 145 in ONU 140 generates an analog Plain Old Telephony (POTs) signal which is transported to the residence 190 via a twisted wire pair drop cable 180. At the residence 190 a Network Interface Device (NID) 183 provides for high-voltage protection and serves as the interface and demarcation point between the twisted wire pair drop cable 180 and the in-home twisted pair wiring 181. In a preferred embodiment TIU 145 generates POTs signals for six residences 190, each having a twisted wire pair drop cable 180 connected to ONU 140.

As shown in FIG. 1, a Broadband Interface Unit (BIU) 150 is located in ONU 140 and generates broadband signals which contain video, data and voice information. BIU 150 modulates data onto an RF carrier and transmits the data over a coaxial drop cable 170 to a splitter 177, and over in-home coaxial wiring 171 to the devices in the residence 190.

In a preferred embodiment 64 ONUs 140 are served by an HDT 130. Each ONU serves 8 residences 190. In an alternate embodiment, each ONU 140 serves 16 residences 190.

As shown in FIG. 1, each device connected to the in-home coaxial wiring 171 will require an interface subsystem which provides for the conversion of the signal from the format on the in-home coaxial wiring 171 to the service interface required by the device. The PID 196 extracts time division information carried on the in-home coaxial wiring 171 and generates a telephone signal compatible with telephone 194. Similarly, the television set-top 198 converts digital video signals to analog signals compatible with TV 199. The NIC card generates a computer compatible signal.

Figure 2:
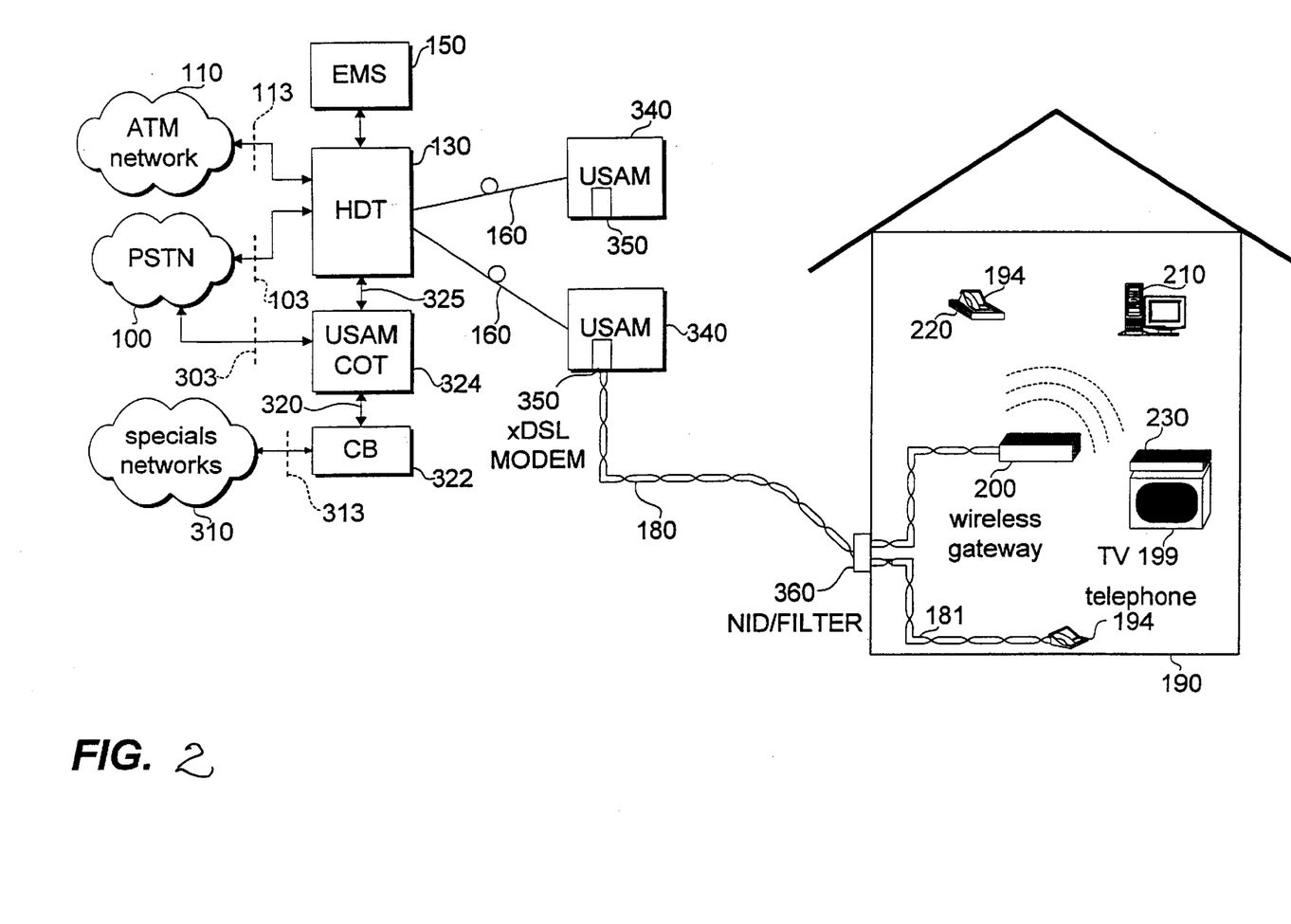
FIG. 2 illustrates a fiber-to-the-curb access system with twisted wire pair drop cable to a residence having a wireless gateway.

FIG. 2 illustrates a FTTC network which relies on twisted wire pair drop cables 180 instead of coaxial drop cables 170. This embodiment is preferable when it is cost prohibitive to install coaxial drop cables from ONUs 140 to residences 190.

As shown in FIG. 2, a Universal Service Access Multiplexor (USAM) 340 is located in the serving area, and is connected to HDT 130 via optical fiber 160. An xDSL modem 350 provides for the transmission of high-speed digital data over the twisted wire pair drop cable 180 to and from residence 190. Traditional analog telephone signals are combined with the digital signals for transmission to the residence 190 and a NID/filter 360 is used to separate the analog telephone signal from the digital signals. The analog telephone signal is sent to telephone 194 over the in-home twisted pair wiring 181.

The digital signals pass through the NID/filter 360 to the gateway 200. The gateway serves as the interface to the devices in the residence 190 including the television 199, the computer 210 and additional telephone 194.

The central office configuration illustrated in FIG. 2 includes a Universal Service Access Multiplexor Central Office Terminal (USAM COT) 324 connected to HDT 130 via a USAM COT-HDT connection 325, which in a preferred embodiment is an STS3c signal transmitted over a twisted wire pair. The PSTN-USAM COT interface 303 is one of the Bellcore specified interfaces including TR-TSY-000008, TR-NWT-000057 or TR-NWT-000303.

A Channel Bank (CB) 322 is also used in the central office to connect specials networks 310, comprised of signals from special private or public networks, to the access system via the specials networks-CB interface 313. In a preferred embodiment, the CB-USAM connection 320 are DS1 signals over twisted wire pairs.

When used herein the term subscriber network refers in general to the connection between the ONU 140 and the devices, splitter, or gateway in the residence 190 or the connection between USAM 340 and the devices or the gateway in the residence 190. The subscriber network may be comprise of coaxial cable and a splitter, twisted wire pairs, or any combination thereof.

Figure 3:
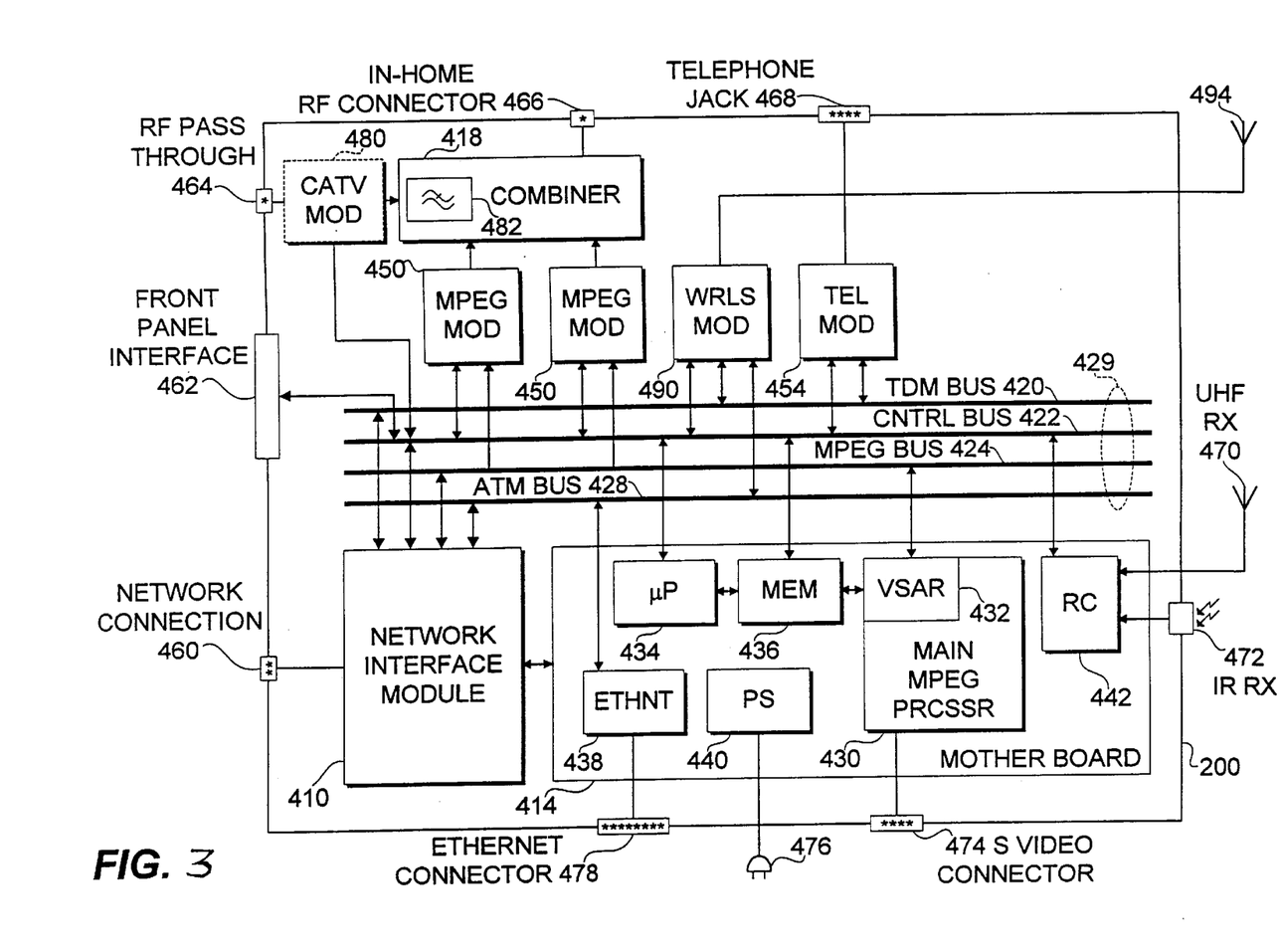
FIG. 3 illustrates an architecture for a video, data and telephony gateway which uses wireless in-home distribution.

Although FIG. 2 and FIG. 3 illustrates, the wireless gateway 200 located inside the living area of residence 190, the gateway can be located in the basement, in the garage, in a wiring closet, on an outside wall of the residence 190, in the attic, or in any of the living spaces. For outside locations gateway 200 will require a hardened enclosure and components which work over a larger temperature range than those used for a gateway located inside the residence 190. Techniques for developing hardened enclosures and selecting temperature tolerant components are known to those skilled in the art.

FIG. 3 illustrates a wireless gateway 200 which can be used with point-to-multipoint in-home wiring such as that created by the gateway-splitter connection, the splitter 177, and in-home coaxial wiring 171, but has the option for a wireless module 490 which can he used to transmit and receive data to devices within residence 190.

Gateway 200 of FIG. 3 is comprised of a Network Interface Module (NIM) 410 which connects to the access network through network connection 460. The access network may have a coaxial drop cable 170 for digital services as or may have a twisted wire pair drop cable 180, as illustrated in FIG. 2. NIM 410 will contain the appropriate modem technology for the access network. In a preferred embodiment, different types of NIMs are utilized for access networks having coaxial drop cables than for access networks having only twisted wire pair drops.

NIM 410 interfaces to a mother board 414 which provides the basic functionality of gateway 200. Mother board 414 contains a microprocessor 434, memory 436, power supply 440 connected to an AC outlet via AC plug 476, a main MPEG processor 430, an Ethernet block 438 which connects to an Ethernet connector 478, and a Remote control block 442.

Within the main MPEG processor 430 there is a Video Segmentation and Reassembly (VSAR) section 432 which constructs MPEG packets from an ATM stream received from NIM 410. VSAR section 432 can reduce jitter in MPEG packets which arises from transmission of those packets over the ATM network, as well as constructing a useable MPEG stream in spite of lost ATM cells which contain partial MPEG packets.

The main MPEG processor 430 has an interface to an S video connector 474 which provides connectivity for televisions having an S video port.

Remote control block 442 has an interface to an IR receiver 472 which can receive commands from a hand-held remote control which is operated within the vicinity of gateway 200. Remote control block 442 also has an interface to a UHF receive antenna 470 which can receive commands from hand-held wireless remotes used anywhere in residence 190.

A set of buses 429 is used to route information within gateway 200 and as illustrated in FIG. 3 includes a Time Division Multiplexing (TDM) bus 420, a control bus 422, a MPEG bus 424, and an ATM bus 428.

A number of optional modules can be inserted into gateway 200 including MPEG modules 450, a DAVIC module, and a telephony module 454. All of the optional modules are connected to the control bus 422 in addition to being connected to at least one other bus which provides those modules with the appropriate types of data for the services supported by the module.

The MPEG modules 450 provide for decompression of MPEG packets which are constructed by the VSAR section 432. The output of the MPEG module 450 is a signal which is compatible with present televisions, which in the US is the NTSC format. MPEG module 450 can modulate the decompressed analog format video signal onto an available channel for transmission to the televisions 199 in residence 190.

The wireless module 490 transmits and receives ATM cells to devices in residence 190 using wireless signals transmitted and received via antenna 494. After reception and demodulation of the wireless signal by the devices the information is in a format which is identical to that used by the access system with coaxial drop cables illustrated in FIG. 1.

The MPEG modules 450 are connected to combiner 418 which combines the RF signals from those modules, and can add other RF signals such as off-air broadcast television signals or Community Antenna Television (CATV) signals supplied by a cable television company. Signals from the antenna or cable system are coupled to the RF pass-through 464, which in a preferred embodiment is an F-connector. A low pass filter 482 is used in combiner 418 to insure that the frequencies used by MPEG modules 450 are available. The output of combiner 418 is connected to in-home RF connector 466, which in a preferred embodiment is an F-connector. The connection between the in-home RF connector 466 and splitter 177 is provided by the gateway-splitter connection, which in a preferred embodiment is a coaxial cable.

An optional CATV module 480 can be inserted into gateway 200 and allow for mapping of off-air or cable video channels from their original frequencies to new frequencies for in-home distribution. Remote control unit 442 can control the channel selection and mapping via control bus 422 which is connected to CATV module 480. Either a hand-held IR remote control or a wireless remote control can be used to change the channel mapping of CATV module 480.

The front panel interface 462 provides for connectivity between the front panel controls (buttons) and the microprocessor 434. Through the front panel control the user can make channel changes as well as changing the configuration of the channels transmitted on the in-home coaxial network.

Telephony module 454 transmits and receives information from TDM bus 420 and produces an analog telephone signal which is compatible with telephone 194. The interface for the telephone is telephone jack 468, which in a preferred embodiment is an RJ-11 jack.

Although this invention has been illustrated by reference to specific embodiments, it will be apparent to those skilled in the art that various changes and modifications may be made which clearly fall within the scope of the invention.

Figure 4:
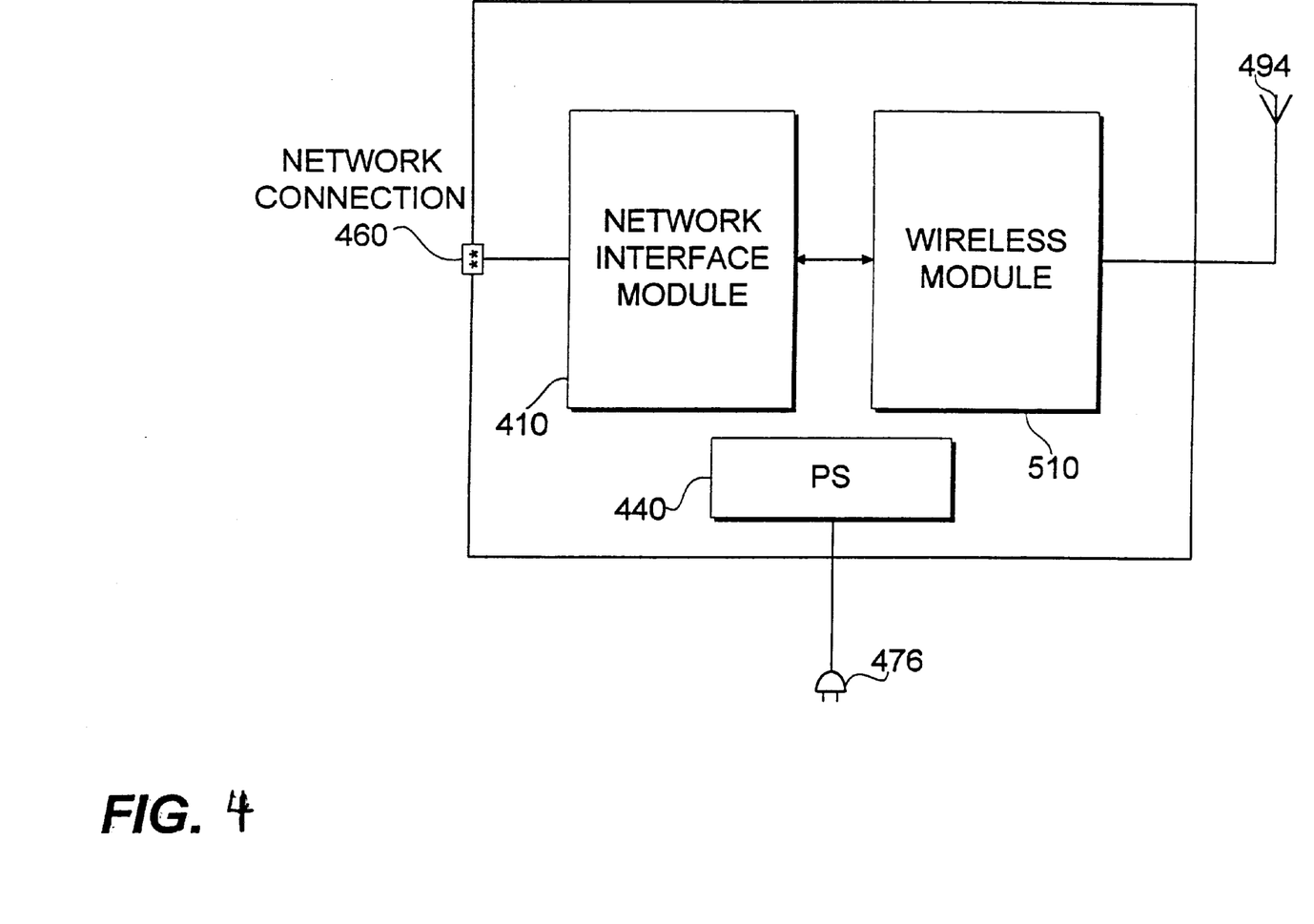
FIG. 4 illustrates a basic wireless gateway.

FIG. 4 illustrates an alternate embodiment for a wireless gateway 200 in which no coaxial or twisted wire pair connections are supported. As illustrated in FIG. 4 a NIM 410 connects to the network via a network connection 460, and to a wireless module 510 which transmits and receives signals to and from the devices in the residence via antenna 494. A power supply 440 provides power for the NIM 410 and wireless module 510 via an AC connector 476.

Figure 5A:
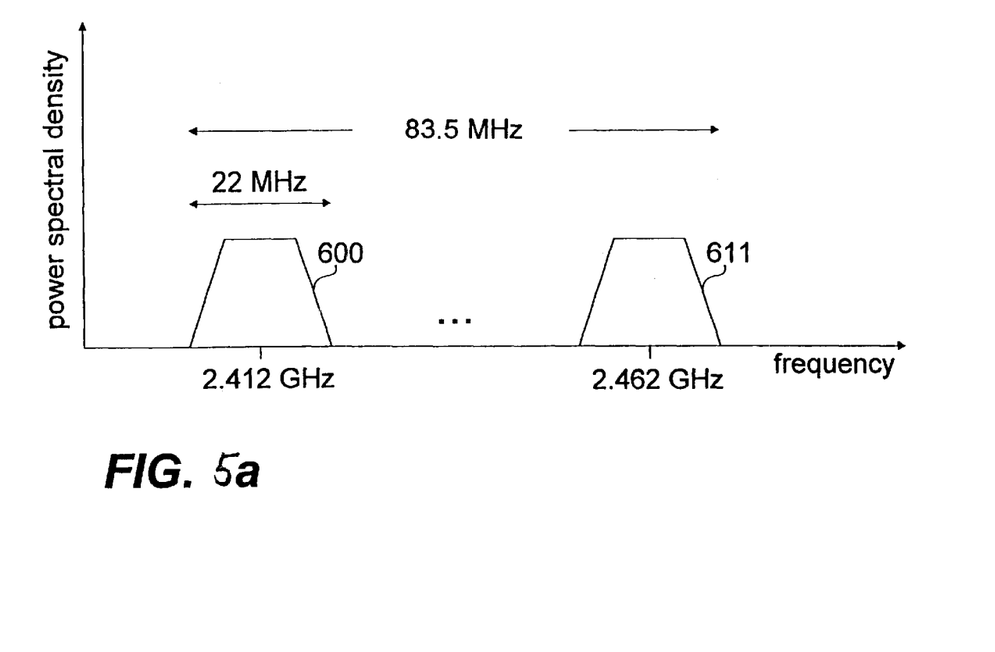
FIG. 5a illustrates a frequency plan for in-home wireless distribution using 11 channels in the 2.4 GHz band.

FIG. 5a represents utilization of spectrum for in-home distribution using the 2.4 GHz frequency band. Eleven 22 MHz channels, channel #1 600 through channel #11 611, are available for use by the devices and the wireless gateway 200.

Figure 5B:
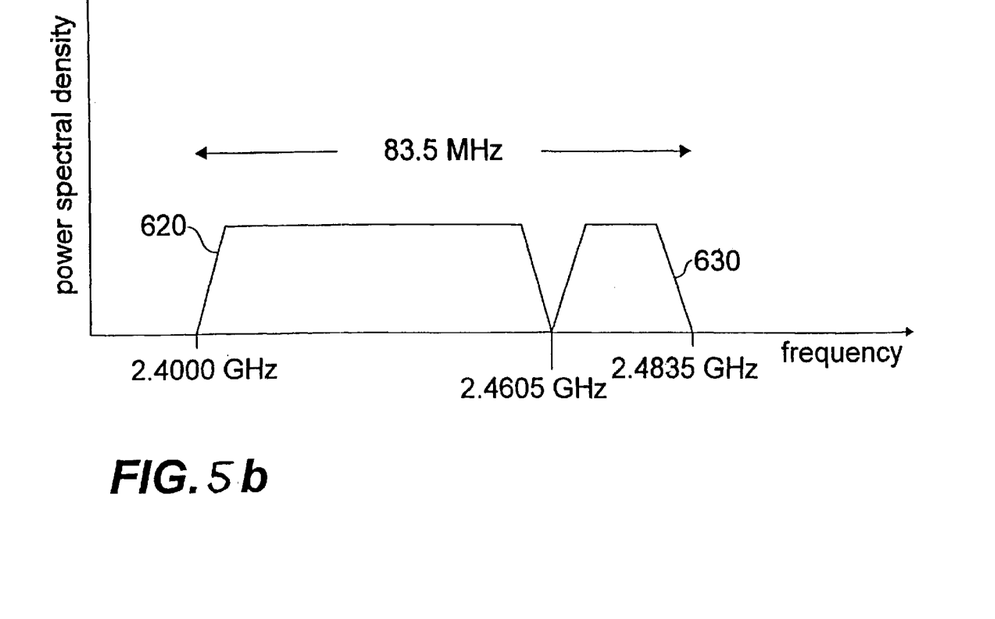
FIG. 5b illustrates a frequency plan for in-home wireless distribution using a downstream channel and an upstream channel.

FIG. 5b illustrates an alternate frequency plan in which one downstream channel 620 is used for communications between the gateway and the devices, and another smaller upstream channel 630 is used for communications between the devices and the gateway.

The invention is intended to be protected broadly within the spirit and scope of the appended claims.

What is claimed is:

1. A method of distributing signals from a residential gateway comprising:

receiving asynchronous transfer mode cells at said residential gateway, wherein the asynchronous transfer mode cells are received via a twisted wire pair cable connecting said residential gateway to a telecommunications network;

extracting a series of MPEG video packets from the asynchronous transfer mode cells;

transmitting the series of MPEG video packets over an MPEG bus to each of a plurality of video decoders and a wireless module;

receiving the series of MPEG video packets at each of the plurality of video decoders;

decoding the series of MPEG video packets at a first video decoder in the plurality of video decoders to produce a first analog television signal compatible with a first analog television set;

receiving the series of MPEG video packets at the wireless module;

generating a wireless signal containing MPEG video packets in the wireless module; and transmitting the wireless signal to a remote receiver for subsequent decoding for a second analog television set.

2. The method of claim 1 wherein the wireless signal is a spread spectrum wireless signal.

3. The method of claim 1, further comprising:
receiving channel change commands from a first remote control located near the first analog television set, wherein the channel change commands trigger a change in the contents of the asynchronous transfer mode cells received via the twisted wire pair cable.

4. The method of claim 3, further comprising:
receiving channel change commands from a second remote control located near the second analog television set, wherein the channel change commands trigger a change in the contents of the asynchronous transfer mode cells received via the twisted wire pair cable.

5. The method of claim 1, further comprising transmitting the first analog television signal to the first analog television set, wherein the first analog television signal is an S-video signal.

6. The method of claim 1, further comprising transmitting the first analog television signal to the first analog television set, wherein the first analog television signal is a NTSC signal.

7. The method of claim 4, wherein
receiving channel change commands from a first remote control comprises receiving infrared channel change commands from the first remote control; and
receiving channel change commands from a second remote control comprises receiving radio wave channel change commands from the second remote control.

8. The method of claim 4, wherein
receiving channel change commands from a first remote control includes receiving infrared channel change commands from the first remote control; and
receiving channel change commands from a second remote control includes receiving the channel change commands via a cable connection.

9. The method of claim 1, further comprising:
extracting digital voice signals from the asynchronous transfer mode cells; and
transmitting the digital voice signals to a telephone module over a time division multiplexing bus.

10. The method of claim 1, further comprising:
extracting digital data signals from the asynchronous transfer mode cells; and
providing the digital data signals to an Ethernet module.

11. The method of claim 1, wherein the telecommunications network is a DSL network.

12. The method of claim 1, wherein the telecommunications network is a very high speed digital subscriber line (VDSL) telecommunications network.

13. The method of claim 1, wherein the telecommunications network is a FTTC network.

14. A residential gateway for distributing signals comprising:
a microprocessor;
memory connected to said microprocessor;
a network interface module, connected to a telecommunications network via a twisted wire pair cable, for receiving asynchronous transfer mode cells and extracting a series of MPEG video packets from the asynchronous transfer mode cells;
an MPEG bus for transporting the series of MPEG video packets from said network interface module to a first video processor and from said network interface module to a wireless module;
wherein the first video processor processes the series of MPEG video packets and creates a first analog signal for a first television set;
wherein the wireless module generates wireless signals for transmission to a receiving device in communication a second television set; and
a control bus connected to the microprocessor, the first video processor and the wireless module.

15. The residential gateway of claim 14 wherein the wireless signals are spread spectrum wireless signals.

16. The residential gateway of claim 14, further comprising:
an infrared receiver for receiving first channel change commands from a first remote control associated with the first television set, wherein the first channel change commands trigger a change in the asynchronous transfer mode cells received via the twisted wire pair cable; and
a wireless receiver for receiving second channel change commands from a second remote control associated with the second television set, wherein the second channel change commands trigger a change in the asynchronous transfer mode cells received via the twisted wire pair cable.

17. The residential gateway of claim 14, further comprising:
an infrared receiver for receiving first channel change commands from a first remote control associated with the first television set, wherein the first channel change commands trigger a change in the asynchronous transfer mode cells received via the twisted wire pair cable; and
a cable compatible receiver for receiving second channel change commands from a second remote control associated with the second television set, wherein the second channel change commands trigger a change in the asynchronous transfer mode cells received via the twisted wire pair cable.

18. The residential gateway of claim 14, wherein the network interface module extracts digital voice signals from the asynchronous transfer mode cells and further comprising
a telephony module for converting the digital voice signals to analog voice signals; and
a time division multiplex bus for transmitting the digital voice signals from said network interface module to said telephony module.

19. The residential gateway of claim 14, wherein the network interface module extracts digital data signals from the asynchronous transfer mode cells and further comprising an Ethernet module for forwarding the digital data signals.

20. A residential gateway for distributing signals comprising:
a microprocessor;
memory connected to said microprocessor;
a network interface module, connected to a telecommunications network via a twisted wire pair cable, for receiving asynchronous transfer mode cells and capable of extracting MPEG video packets, digital data signals and digital voice signals from the asynchronous transfer mode cells;
a plurality of video processors, associated with a plurality of televisions, for processing the MPEG video packets and creating analog video signals for the associated televisions;
a wireless module, for generating spread spectrum signals for transmission to a receiving device in communication with a wireless-remote television set an MPEG bus for transporting the MPEG packets from said network interface module to said plurality of video processors and to said wireless module;

a telephony module for converting the digital voice signals to analog voice signals;

a time division multiplex bus for transmitting the digital voice signals from said network interface module to said telephony module;

an Ethernet module for transmitting the digital data signals to equipment associated with the residential gateway;

a receiver for receiving channel change commands from remote controls associated with the plurality of televisions and the wireless-remote television, wherein the channel change commands trigger a change in the contents of the asynchronous transfer mode cells received via the twisted wire pair cable; and a control bus, connected to said microprocessor, said plurality of video processors, said wireless module, said Ethernet module and said telephony module.

* * * * *